UNITED STATES PATENT OFFICE.

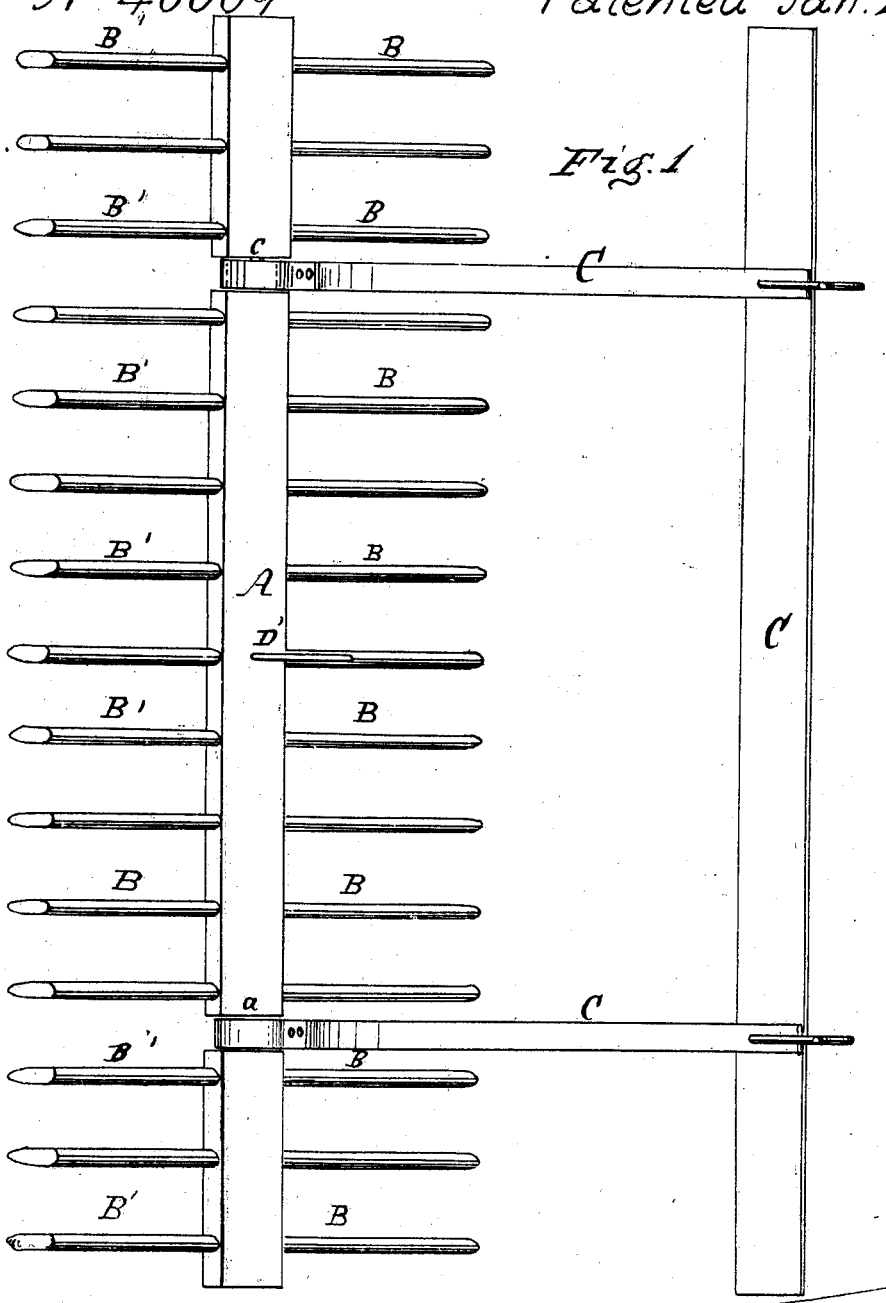

E. C. MARTIN, OF WEST LIBERTY, IOWA.

IMPROVEMENT IN HORSE-RAKES.

Specification forming part of Letters Patent No. 46,009, dated January 24, 1865.

*To all whom it may concern:*

Be it known that I, E. C. MARTIN, of West Liberty, in the county of Muscatine and State of Iowa, have invented a new and useful Improvement in Hay-Rakes; and I do hereby declare the following to be a full and exact description of the same, reference being had to the accompanying drawings, making part of this specification, in which—

Figure 1 is a plan of a rake embodying my invention. Fig. 2 is an end elevation of the same.

Similar letters of reference indicate corresponding parts in the two figures.

The subject of my invention is a tumbling rake, in connection with which are employed supporting-arms to give the proper inclination to the rake-teeth and adapt the rake to be readily tilted over as soon as it gathers together the requisite amount of hay.

The invention consists in making the supporting-arms adjustable by the use of flexible metal, so as to vary the inclination of the teeth to suit the character of the ground over which they move; and it also consists in arranging the supporting-arms reversely to the respective rows of teeth, so that they will drag behind the same and impart steadiness to the machine, all as will be fully explained.

The following description will enable those skilled in the art to which my invention appertains to fully understand and use the same.

In the accompanying drawings, A represents the rake-head, which has two rows of teeth, B B', ranged at opposite sides of the axis of the rake-head, to perform the work alternately as the rake is overturned in customary manner. The rake-head has journals *a a* and corresponding bearings in the frame C, to which a team may be attached.

In the upper and under side of the rake-head A are inserted one or more arms or supports, D D', which serve as runners for the machine and sustain the rake-head above the ground at such height as will give the proper inclination to the rake-teeth. These supporting-arms are composed of any flexible metal which has the property of remaining in any position to which it may be bent, and hence as one end of each arm is free they may be so bent as to support the rake-head in a higher or lower position, and thus vary the inclination of the rake-teeth. The arm D, by being bent, regulates the inclination of the teeth B. When the latter are moving in contact with the ground to perform the raking operation, as exhibited in Fig. 2, the arm D projects behind the rake-head, while the teeth B project forward of the same. Thus the machine is supported at points in front of and behind the axis of the head A, to insure steadiness and adapt the machine to run without being held by hand from tilting over prematurely, and it requires slight exertion to revolve the rake at the proper time. The arm D' bears the same relation to the teeth B' as the arms D to the teeth B.

By the common method the supporting-arms are attached at both ends, one end to the rake-head and the other to the teeth, and they drag in front of the rake-head instead of behind the same, in order that the rake may be tilted by the application of the smallest possible amount of strength; but it is manifest that this advantage is only imaginary in view of the consideration that it requires a constant pressure by hand, or somebody to be always on the lookout, to prevent the rake from tilting over before the proper time; hence a person not equal to the task of preventing the ordinary rake from turning prematurely may without difficulty conduct the operation of my improved implement.

One, two, or more supporting-arms may be used at the respective upper and under sides of the rake-head.

Having thus described my invention, what I claim as new, and desire to secure by Letters Patent, is—

The combination, with a revolving rake, A B B', of the flexible metallic supports D D', detached at one end, and so arranged as to move in contact with the ground behind the rake-head, substantially as and for the purpose explained.

E. C. MARTIN.

Witnesses:
  ASA GREGG,
  WM. GREGG.